United States Patent [19]

Rowley

[11] 4,024,977

[45] May 24, 1977

[54] SAFETY CLIP MEANS FOR REUSABLE SHIPPING CONTAINER

[76] Inventor: Edward C. Rowley, 1725 Hallam Drive, Lakeland, Fla. 33803

[22] Filed: June 14, 1976

[21] Appl. No.: 695,817

Related U.S. Application Data

[63] Continuation-in-part of Ser. No. 601,981, Aug. 5, 1975, Pat. No. 3,990,599.

[52] U.S. Cl. .............................. 217/12 R; 217/65; 217/69; 292/253
[51] Int. Cl.² .......................................... B65D 9/12
[58] Field of Search ............. 217/12 R, 43 R, 43 A, 217/65, 69; 312/140, 111; 292/253, 258; 24/81 BF; 190/37; 220/4 F

[56] References Cited

UNITED STATES PATENTS

| 910,324 | 1/1909 | Sessions | 190/37 |
|---|---|---|---|
| 1,325,493 | 12/1919 | Kenniker | 217/12 R |
| 2,266,181 | 12/1941 | Epps | 190/37 |
| 2,541,846 | 2/1951 | Ullrich et al. | 217/69 |
| 2,590,159 | 3/1952 | Davis | 217/65 |
| 2,896,808 | 7/1959 | Papy et al. | 217/66 |
| 3,082,897 | 3/1963 | Highley | 217/69 X |
| 3,236,405 | 2/1966 | Reil | 220/4 F |
| 3,323,674 | 6/1967 | Nist, Jr. | 217/65 X |
| 3,823,967 | 7/1974 | Knize | 292/258 |
| 3,921,846 | 11/1975 | Mellott et al. | 217/65 |
| 3,990,599 | 11/1976 | Rowley | 217/12 R |

Primary Examiner—Stephen P. Garbe
Attorney, Agent, or Firm—B. P. Fishburne, Jr.

[57] ABSTRACT

Right angular corners of knock-down reusable multipanel containers are releasably joined in assembled relationship by metal reinforcing plates and right angular spring clips which span the corners. Formed terminals on the clip arms are received by apertures of the reinforcing plates. One such aperture is relatively large to receive a release implement and the adjacent clip terminal is slotted to receive the release implement after insertion thereof through the aperture. The aperture of the other reinforcing plate is relatively narrow to prevent dangerous separation of the clip from the container following the release of one arm thereof by means of said implement.

5 Claims, 4 Drawing Figures

SAFETY CLIP MEANS FOR REUSABLE SHIPPING CONTAINER

CROSS-REFERENCE TO RELATED APPLICATION

This application is a continuation-in-part of copending application Ser. No. 601,981, filed Aug. 5, 1975 now U.S. Pat. No. 3,990,599 for REUSABLE SHIPPING CONTAINER.

BACKGROUND OF THE INVENTION

A need for the present invention has arisen as a result of practical experience in the field with certain reusable shipping containers for household goods and the like which have separable panels joined in assembled relationship at the corners of a boxlike formation by separable spring clips and coacting metal reinforcing plates. Such a reusable shipping container is fully disclosed in the above-referenced patent application and the same form of container is disclosed in this application.

Occasionally, during the knocking-down of containers of the mentioned type and in the releasing of the right angular spring clips which secure them, one of the clips, after being released by a screwdriver blade or like implement, will tend to fly off of the container and could potentially injure an eye or some other part of nearby personnel. While no such injuries have occurred as far as can be determined, the present invention has been conceived in the interest of maximum human safety to avoid even the remotest possibility of such a happening or injury during the release of the securing spring clips in the field.

The present invention provides a clip having special means to receive a release implement, such as a screwdriver blade, at one arm only of the clip and within a special opening at the adjacent reinforcing plate which interlocks with one terminal of the clip when the clip is applied to the container. The other clip locking terminal is received removably in a relatively narrow locking slot of the other reinforcing plate forming the adjacent corner of the container in such a manner that when the one arm of the clip is released by use of the implement, it is not possible for the clip to fly off of the container at high velocity and strike someone's eye or face or cause any injury whatsoever. The released clip will instead remain loosely attached to the container and can be lifted free without difficulty. In other aspects, the invention is essentially as disclosed in said prior application.

Other features and advantages of the invention will become apparent during the course of the following description.

BRIEF DESCRIPTION OF THE DRAWING FIGURES

DETAILED DESCRIPTION

Figure 1:
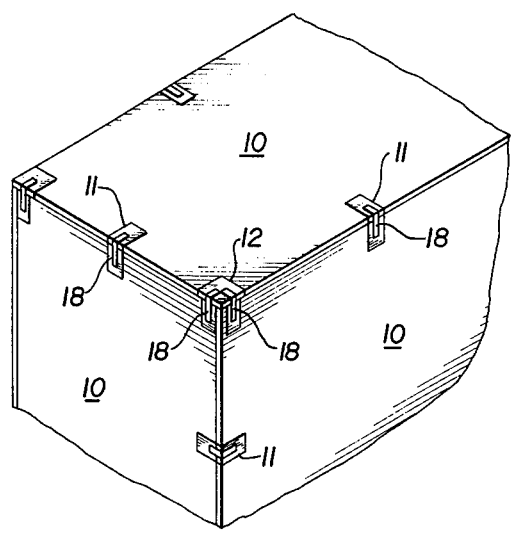
FIG. 1 is a fragmentary view of a knockdown reusable shipping container and clip embodying the invention.
Figure 2:
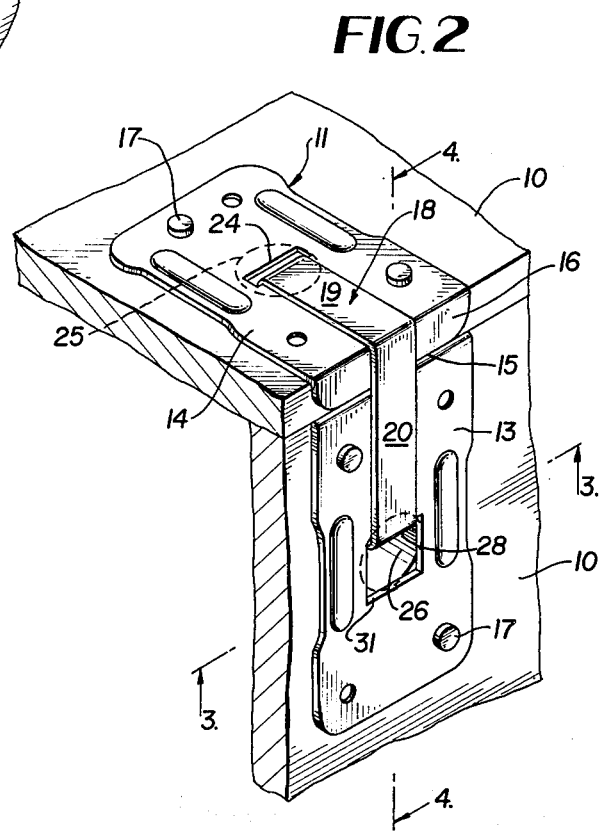
FIG. 2 is an enlarged fragmentary perspective view, partly in section, of one typical corner fastening assembly.
Figure 3:
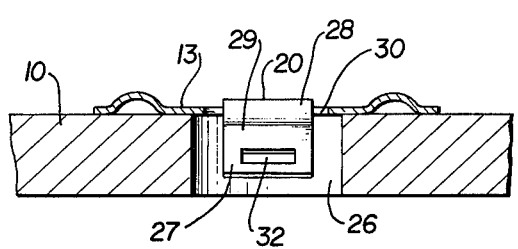
FIG. 3 is a fragmentary horizontal section taken on line 3—3 of FIG. 2.

Referring to the drawings in detail wherein like numerals designate like parts, a rectangular knock-down reusable container is shown in FIG. 1 and is of the type shown in said prior application and on which the present invention is utilized. As disclosed in said application, the container includes flat separable panels 10 of wood or the like which are joined in assembled relationship when the container is erected by simple and compound corner fastener assemblies 11 and 12. For the purposes of describing this invention, it will suffice to describe in detail one of the simple corner fastener assemblies 11 shown particularly in FIGS. 2 through 4 of the drawings.

Figure 4:
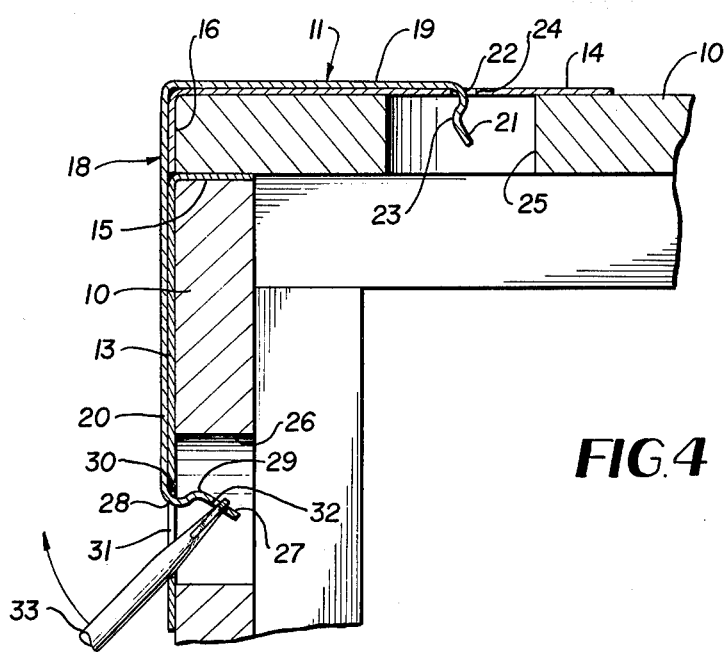
FIG. 4 is an enlarged fragmentary vertical section taken on line 4—4 of FIG. 2.

With reference to these figures, each corner assembly 11 comprises a pair of companion metal reinforcing plates 13 and 14 secured fixedly to the exterior faces of the pair of panels 10 forming a right angular corner on the knock-down container. For the sake of increased security and strength, end flanges 15 and 16 on the plates 13 and 14 are formed at right angles to the plate bodies and lap the adjacent edges of the panels 10, as shown in FIG. 4. The sturdy reinforcing plates 13 and 14 are anchored to the panels 10 by suitable fasteners 17.

To secure the container in erected from, each corner assembly further includes a strong spring metal clip 18 which is right angular during use, FIG. 4, but which, in a relaxed state, not shown, is formed so that its two arms 19 and 20 from an included angle of less than 90° and preferably about 80–85°. Therefore, when the clip 18 is applied to the right angular corner of the container, it is tensioned tending to grip or squeeze the corner.

As shown in the drawings, the clip arm 19 is somewhat shorter than the arm 20 and both arms are adapted to lie flat against the respective plates 14 and 13 in the assembly 11 while spanning or surrounding the container corner and lapping the flange 16 of the reinforcing plate 14.

The shorter clip arm 19 has an inwardly formed terminal locking end 21 or terminal which is reversely curved at 22 and 23, the portion 23 forming a locking shoulder with relation to the near edge of a relatively narrow straight edge locking slot 24 formed through the plate 14. The dimensions of the slot 24 and locking terminal 21 are such that the terminal 21 can be separated by hand from the plate 14 following release of the other clip arm 20 by means yet to be described. However, the arrangement is such that following such release of the lip arm 20 the clip 18 will not fly free of the plate 14 and container and instead will maintain a loose hinged connection with the plate 14 through the slot 24 until removed by hand. This is the main feature of the invention which eliminates the safety hazard caused by the possibility of the clip flying off of the container and striking the eye during removal.

To accommodate the clip locking terminal 21 inwardly of the reinforcing plate 14, a clearance opening 25 of generous proportions is provided in the panel 10 under the plate 14. A similar clearance opening 26 is provided in the other panel 10 for the locking terminal 27 of the longer clip arm 20.

The locking terminal 27 of the clip arm 20 is also reversely curved at 28 and 29, with the bend 29 forming a locking shoulder relative to the near straight edge 30 of a comparatively large rectangular locking opening 31 formed through the reinforcing plate 13 in registry with the opening 26. The straight end portion terminal 27, FIG. 4, is lower than the corresponding end portion 21 and is at a greater inclination to the arm 20.

Near its free end, the terminal 27 has a slot 32 formed therethrough for the reception of a clip release implement 3, such as the blade of a screwdriver. The plate opening 31 is sufficiently wide to allow entry of the release implement 33 substantially normal to the straight terminal 27 while the implement is against the far edge of the opening 31, namely, the lower edge in FIG. 4. With the tip of the implement in the slot 32, the implement is swung in the direction of the arrow and this will release the clip arm 20 easily from the opening 32 of plate 13. At the instant of release, the clip arm 19 may swing away from the underlying plate 14 but will not separate from this plate due to the relative narrowness of the slot 24 and the geometry of the terminal 21 relative to this slot. Thus, there is no danger of a loose clip flying through the air and causing injury to a bystander.

Following release of the clip arm 20 by the implement 33, the arm 19 is easily separated manually from the plate 14. It will be noted that the size of the slot 24 prevents entry of a screwdriver or the like therethrough to engage the terminal 21 when the clip is engaged and there is no possibility of improperly releasing the clip or improperly applying it since the arms 19 and 20 are of different lengths and the clip can only be applied in one way, as shown, and can only be released in the proper manner.

The advantages of the invention over the prior art should now be clear and the safety feature embodied in the invention should also be appreciated by those skilled in the art.

It is to be understod that the form of the invention herewith shown and described is to be taken as a preferred example of the same, and that various changes in the shape, size and arrangement of parts may be resorted to, without departing from the spirit of the invention or scope of the subjoined claims.

I claim:

1. In a knock-down reusable container having panels which are separably joined substantially in right angular relationship, a pair of reinforcing plates attached to the exterior faces of said panels adjacent a corner of the container formed by the panels, the panels having clip clearance openings near and inwardly of said corner, a substantially right angular spring clip forming said corner and having arms which lie on the outer faces of said reinforcing plates, said arms having inwardly directed formed locking terminals at their free ends, the improvement comprising the provision of a relatively narrow slot in one reinforcing plate above one clearance opening and receiving one clip locking terminal, the other reinforcing plate having a relatively large opening above the other clip clearance opening and receiving the other clip locking terminal, said other clip locking terminal having an opening formed therethrough near its free end and said opening lying within the last-named clearance opening, whereby a clip release implement may be inserted through said relatively large opening of said other reinforcing plate and into the clip terminal opening to release one arm of the clip from said other reinforcing plate, said relatively narrow slot of said one reinforcing plate then coacting with the clip locking terminal therein to prevent the spring clip from suddenly separating from the container.

2. In a knock-down reusable container as defined in claim 1, said opening formed through said other clip locking terminal comprising a slot adapted to receive a screwdriver blade or like implement within the adjacent clearance opening of one panel.

3. In a knock-down reusable container as defined in claim 2, and said formed locking terminals comprising reversely curved locking extensions on the clip arms which interlock with corresponding edges of the openings of said reinforcing plates, at least said other clip locking terminal having an angled end portion and said slot adapted to receive a screwdriver blade formed through said angled end portion.

4. In a knock-down reusable container as defined in claim 1, and the arms of said spring clip being of unequal lengths, said other clip locking terminal having the opening therethrough being carried by the longer clip arm, said slot and relatively large opening of the reinforcing plates spaded from the container corner to receive said locking terminals of the shorter and longer clip arms, respectively.

5. In a knock-down reusable container having separable panels joined in right angular relationship, a pair of metal reinforcing plates on the exterior faces of said panels, said reinforcing plates having relatively narrow and relatively wide openings formed therethrough respectively inwardly of a corner of the container, said panels having recess means adjacent the reinforcing plate openings, and a substantially right angular spring clip spanning said corner and having arms which engage the outer faces of the reinforcing plates, said clip arms having laterally inwardly projecting locking terminals at their free ends which and interlock with said relatively narrow and relatively wide openings of the reinforcing plates, the clip locking terminal, which is adjacent to the relatively wide opening, disposed within the recess means of one panel and is positioned relative to said wide opening in such a manner that a clip release implement is insertable through the relatively wide opening and into engagement with the clip locking terminal adjacent thereto, the other clip locking terminl being held captive in the relatively narrow opening at the moment of release of the spring clip by means of said implement.

* * * * *